July 3, 1951 B. H. BALDRIDGE 2,559,388
TELEVISION RECEIVER TESTING APPARATUS
Filed July 6, 1949
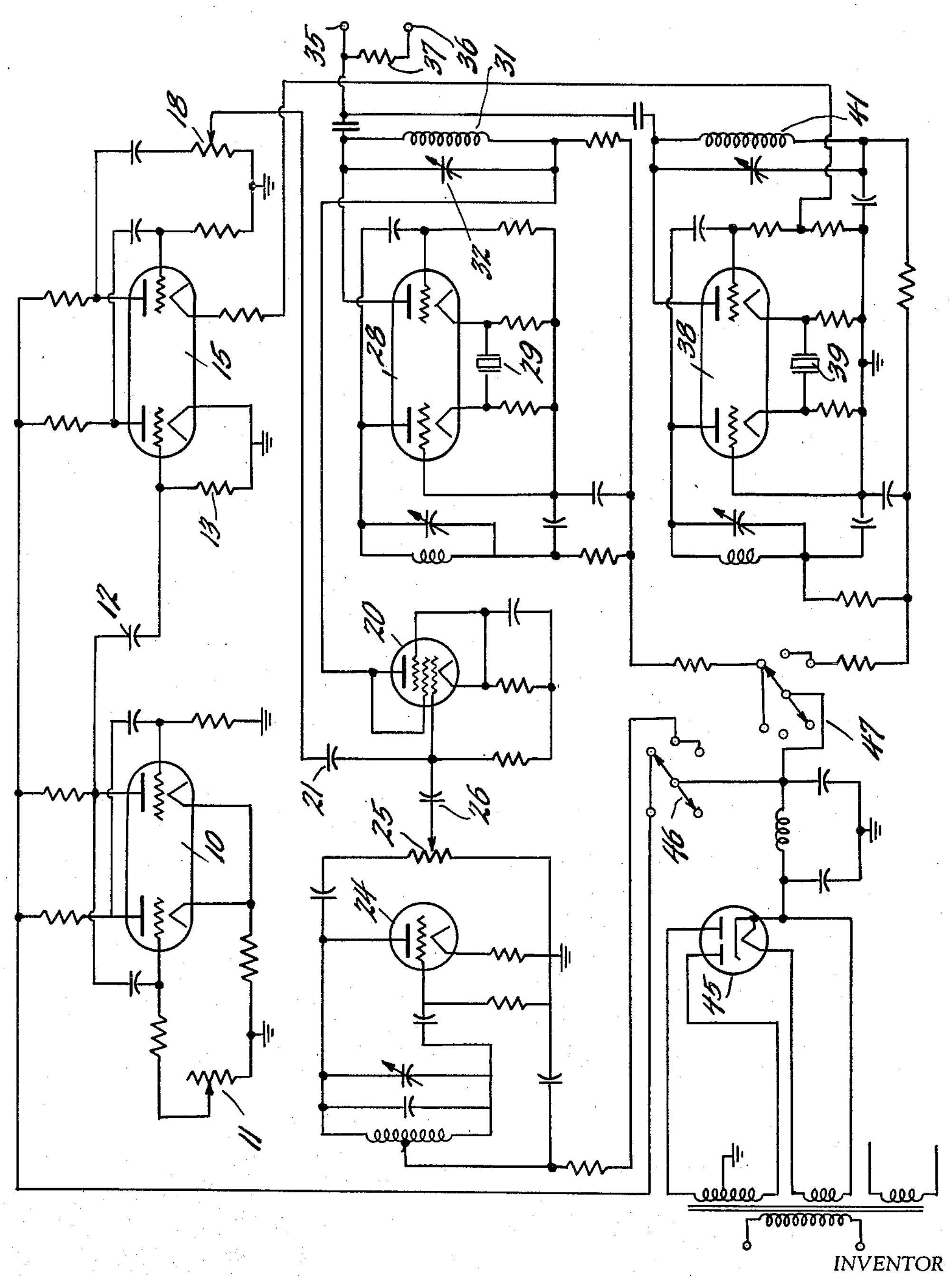
INVENTOR
Bernard H. Baldridge,
BY Watson, Cole, Grindle & Watson
ATTORNEYS Patented July 3, 1951

2,559,388

UNITED STATES PATENT OFFICE 2,559,388

TELEVISION RECEIVER TESTING APPARATUS

Bernard Horace Baldridge, Evansville, Ind., assignor to Electronics Research, Inc., Evansville, Ind., a corporation of Indiana Application July 6, 1949, Serial No. 103,274

3 Claims. (Cl. 178—7.5)

This invention relates to the testing of television receivers in the absence of standard or test pattern broadcasts and has for its principal object the provision of an improved and simplified method of locating faulty operation of receiver components, and to simple and inexpensive apparatus for use in the practice of the method.

Testing of television receivers is commonly effected by applying to the receiver the conventional RMA test pattern, and in order that tests may be made in localities or during periods when test broadcasts are not available, equipment for generating the standard signal locally is frequently used. Such equipment is complicated, expensive, and cumbersome, as compared with equipment of the nature contemplated herein. Simpler equipment is available for the testing of selected circuits or components by internal connection to the receiver, but is obviously not suited to rapid diagnosis of faults at the normal receiver location.

It is proposed, therefore, in accordance with the present invention to provide for the testing of receivers by the local generation and application to the receiver antenna or signal input terminals of a simplified form of signal by means of which many of the common receiver defects may be quickly located and determined, the signal being capable of generation by compact, inexpensive, readily portable apparatus. More specifically, it is an object of the invention to provide a method of testing television receivers which comprises applying to the receiver input a modulated carrier of picture channel frequency, said carrier being modulated by two constant frequency waves, of which the frequencies are small multiples respectively of the number of scanning lines per second and the number of picture frames per second for which the receiver is designed. In the preferred form of the invention one of the modulating waves, usually that of lower frequency, is a square wave, the wave of higher frequency being either a sine or a square wave. Such a signal is capable of putting on the screen a relatively small number of vertical and horizontal lines, forming a checked pattern from which improper operation of any of a number of receiver components is immediately made apparent, as hereinafter more fully explained.

It is also proposed, as part of the invention, to apply to the receiver terminals a second carrier, frequency modulated by the aforesaid wave of lower frequency, for alternately or concurrently testing the audio or sound circuits of the receiver.

Further objects and features of the invention will appear from the following description taken with the accompanying drawing, in which is shown a wiring diagram of a preferred form of apparatus capable of use in the practice of the invention.

Reference is made hereinafter to this embodiment of the drawing, and specific language is used to describe the same. It will nevertheless be understood that no limitation of the scope of the invention is thereby intended, such further alterations and modifications in both apparatus and method being contemplated as would normally occur to one skilled in the art to which the invention relates.

Apparatus essentially similar to that shown in the drawings has been highly successful for the intended purpose of testing television receivers by the method of the invention. This apparatus is adapted to supply to the input circuit of a receiver a picture signal comprising a carrier wave of picture channel frequency, amplitude modulated by a square wave and a sine wave, and a sound carrier of appropriate frequency, modulated by the same square wave. As hereinbefore indicated, the frequencies of the modulating signals are small multiples of the scanning and frame frequencies, arbitrarily chosen in the preferred embodiment as 7 and 10 respectively. Thus the sine wave in this embodiment may have a frequency of 110,250 cycles, this figure being derived by multiplying the 525 scanning lines by the 30 frames per second by 7, existing television standards requiring 15,750 scanning lines per second. The square wave in the same embodiment may have a frequency of 300 cycles per second, obtained by multiplying the conventional 30 frames per second by 10. Small numbers selected to determine these frequencies may vary widely, but are preferably chosen with regard to the proportions of the standard picture frame, although even this relationship is not essential. The frequency of the square wave should, of course, be such as to produce a frequency within the audible range for the purpose of testing the sound section of the receiver also, and the amplitude of both the modulating waves should be sufficient to effect control of the receiver synchronization circuits.

Thus when a carrier wave modulated with a video signal as described is supplied to a television receiver, the usual sweep circuit is synchronized on every seventh cycle of the 110,250 cycle sine wave, assuming proper synchronization adjustment in the receiver. Since this sine wave is also applied in the receiver to the intensity grid of the picture tube, instensity modulation, synchronized with the sweep, will occur, and in the absence of other modulation will produce seven vertical light bars on the screen. Similarly, the detected 300 cycle square wave is applied in the receiver to the vertical sweep circuits through the receiver integrating circuits, and with proper synchronization adjustment of the receiver will effect frame synchronization with every fifth cycle, assuming that the standard method of interlaced scanning is employed. The square wave will also produce, by application to the intensity grid of the picture tube, five horizontal light bars on the screen in the absence of other modulation. The seven vertical and the five horizontal light bars when concurrently displayed thus produce five rows of seven rectangles on the screen, the dark areas corresponding to periods of intensity blanking. The rectangles may be varied in width by contrast and brilliance adjustments of the receiver, since the vertical lines are derived from the sloping wave front of the higher frequency sine wave, but if the lower frequency wave is a square wave, the height of the rectangles is not subject to corresponding adjustment. The frequency modulated sound wave is reproduced in the sound section of the receiver, when functioning properly, as a continuous audible note of a constant pitch determined by the frequency of the square wave modulation.

For reasons which will be apparent hereinafter, it is preferable that at least one of the modulating waves be a square wave, and preferably one square wave and one sine wave is employed in order that the maximum number of circuit components of the receiver may be checked. Advantageous results may be obtained, however, by the use of modulating waves of which both are sine waves or both are square waves, and in its broader aspect the invention contemplates such modifications.

Referring now more specifically to the drawing, and making reference for convenience to the frequencies arbitrarily chosen and at present successfully employed, it will be observed that the square wave of 300 cycle frequency is generated in a multivibrator circuit employing a twin triode 10, the circuit elements and their constants being chosen in accordance with customary practice to produce a signal characteristic of multivibrator circuits, having a steep wave front. Preferably a potentiometer 11 is introduced in the grid circuit for the first set of electrodes as shown to provide for fine adjustment of frequency of oscillation. The output of the circuit is applied through condenser 12 and across resistor 13 to the control grid of one set of electrodes of a twin triode 15, which is arranged in a conventional amplifying circuit functioning as a clipper for the 300 cycle square wave and also as a buffer between the modulator and the square wave generator. The output of the clipper amplifier circuit is supplied through condenser 21 to the control grid of modulator tube 20, potentiometer 18 providing the desired coupling adjustment.

The sine wave of 110,250 cycles is generated in a Hartley oscillator circuit embodying tube 24 and is fed through coupling potentiometer 25 and condenser 26 to the control grid of modulator tube 20. The output of tube 20, comprising the combined square and sine wave energy, is employed to effect Heising modulation of the carrier wave generator by addition to the generator plate voltage to vary the output amplitude.

Thus the carrier generator may comprise a cathode coupled oscillator employing a twin triode tube 28, the circuit being conventional and being controlled as to frequency by crystal 29, the oscillator operating on the crystal harmonic. The signal output from modulator tube 20 is supplied to the plate of the second set of electrodes through a tuned circuit comprising winding 31 and variable condenser 32, and the carrier thus modulated is capacity coupled with output terminal 35 of the apparatus, terminal 36 being connected to terminal 35 through resistor 37 to provide optimum flexibility with various types of antenna lead-in conductors when the output terminals are applied to the input terminals of a receiver to be tested. The frequency of the carrier wave is suitable for selection by standard television receivers, corresponding to a picture channel.

A generator for a carrier wave at sound channel frequency is also preferably provided, and may comprise a cathode coupled oscillator employing a twin triode tube 38, the frequency being controlled by crystal 39. The carrier generated in this circuit is modulated by the 300 cycle square wave derived from the cathode of the second set of electrodes of tube 15 and applied to the grid of the second set of electrodes of tube 38. The output of tube 38 is supplied to winding 41 from which the signal is fed capacitively to output terminal 35.

Plate voltage is supplied to the various components of the apparatus by full wave rectifier 45, a three-position switch 46 being provided in the rectifier output circuit, whereby either or both of the square and sine wave generators and their associated circuits may be rendered selectively operable by connection with the plate voltage supply, to place on the receiver screen either the checked pattern hereinbefore described, or the vertical or horizontal bars only. A three-position switch 47 is also provided to connect either or both of the picture and sound channel generators with the source of plate voltage, whereby the video and sound sections of the receiver may be alternately or concurrently tested.

Among the tests which may be made with the simplified apparatus herein described are the following:

1. Generally correct set operation is indicated when five rows of seven squares (or rectangles) appear and completely fill the desired picture area, and the sound tone is reproduced on the audio system.

2. Location of defective sections and receiver components is readily effected. Malfunction is indicated in the R. F., oscillator, or mixer section if no sound or picture output appears. Malfunction past the sound-picture separation circuits and correct functioning except for possible picture channel misalignment to this point is indicated if either sound or picture output is obtained. Presence of sound or picture only indicates a defective video or audio circuit, respectively.

3. Vertical and horizontal scanning rates, linearity, and amplitude, together with synchronization separation and operation, may be thoroughly checked. The correct vertical scanning rate is indicated when five horizontal bars or rows of rectangles appear on the picture; correct horizontal scanning rate is indicated when seven vertical bars or rows of rectangles appear on the picture. The degree of linearity is indicated by the spaces between bars or squares, since equal time intervals are represented by each. Sweep amplitude adjustment is made to allow for the diminishing of the raster size with blanking. Correct synchronization is indicated if five rows of seven rectangles appear on the picture; lesser or greater numbers indicate incorrect synchronization and/or sweep rate. Interlace will function properly if the synchronization will produce five rows of seven squares each.

4. Power supply filter adequacy and hum pick-up on the video circuits are indicated. Provision is made to permit a slight variation of the frame rate from the power line frequency. Video hum pick-up appears as brilliance modulation and filter ripple appears as brilliance modulation and distortion on a portion of the picture. Both will appear to roll but will stop when the frame rate is varied to equal the line frequency.

5. Focus, brilliance, positioning, and other electron optics controls, except contrast, may be adjusted and interaction noted in the same manner as with standard television signals. Contrast adjustment and controls affecting contrast will vary the width only of the squares or vertical bars.

6. Correct tuning of the receiver is best indicated by sound output, since the nature of the sound and the channel width are best suited for correct tuning. Good low frequency band pass and phase shift characteristics are indicated by the degree of preservation of square corners on the figures.

It will be appreciated that in the event the present prescribed standard number of scanning lines and number of frames per second should be changed, corresponding change in the frequencies of the two modulating video waves would be required, it being essential that the frequencies of these waves be multiples of the conventional line and frame frequencies. This, however, is a rather remote possibility since any such change would render obsolete all television receivers now in use or in the course of manufacture or distribution.

While reference is made herein to the application of the modulated carrier waves, or either of them, to the input terminals of a television receiver, it will be recognized that this may be done by radiation of the modulated waves as well as by direct connection to the receiver terminals or to the antenna, or otherwise by supplying the receiver input circuits with the modulated carrier waves, as distinguished from the application of signal energy to the receiver by means of internal connections to components or sections thereof.

Having thus described the invention, what is claimed as new and desired to be secured by Letters Patent is:

1. Apparatus for use in testing television receivers, comprising, in combination, a generator of a carrier wave of television channel frequency, generators of two video waves having frequencies which are multiples respectively of the conventional number of scanning lines per second and the number of picture frames per second, means modulating said carrier wave with both of said video waves, a second carrier wave having a sound channel frequency, and means modulating the frequency of said second carrier wave with the second of said two video waves.

2. Apparatus for use in testing television receivers, comprising, in combination, a generator of a carrier wave of television channel frequency, generators of two video waves having frequencies which are multiples respectively of the conventional number of scanning lines per second and the number of picture frames per second, means modulating said carrier wave with both of said video waves, a second carrier wave having a sound channel frequency, means modulating the frequency of said second carrier wave with the second of said two video waves, a common output line for the modulated carrier waves, and means concurrently applying the modulated carrier waves to said line.

3. Apparatus for use in testing television receivers, comprising, in combination, a generator of a carrier wave of television channel frequency, generators of two video waves having frequencies which are multiples respectively of the conventional number of scanning lines per second and the number of picture frames per second, the first of said video waves being a sine wave and the second a square wave, means modulating said carrier wave with both of said video waves, a second carrier wave having a sound channel frequency, and means modulating the frequency of said second carrier wave with the second of said two video waves.

BERNARD HORACE BALDRIDGE.

REFERENCES CITED

The following references are of record in the file of this patent:

FOREIGN PATENTS

| Number | Country | Date |
|---|---|---|
| 520,349 | Great Britain | Apr. 22, 1940 |